(12) United States Patent
Johnston et al.

(10) Patent No.: US 6,396,989 B1
(45) Date of Patent: May 28, 2002

(54) FIBER OPTIC CABLE RETAINER ASSEMBLY AND CLIP WITH A BEND-RADIUS CONTROL SURFACE

(75) Inventors: Dare P. Johnston, Raleigh, NC (US); Michael Mattei, Smithtown; Robert P. Auteri, Manorville, both of NY (US); Erwin F. Hani, Charlotte, NC (US); Michael T. Herda, Hoboken, NJ (US); Steven J. Muske, Batavia, OH (US); David W. Suttie, Onalaska, WI (US)

(73) Assignee: Tyco Electronics Corporation, Fuquay-Varina, NC (US)

( * ) Notice: Subject to any disclaimer, the term of this patent is extended or adjusted under 35 U.S.C. 154(b) by 116 days.

(21) Appl. No.: 09/587,663

(22) Filed: Jun. 5, 2000

Related U.S. Application Data

(63) Continuation-in-part of application No. 09/505,290, filed on Feb. 16, 2000.
(60) Provisional application No. 60/120,788, filed on Feb. 19, 1999.

(51) Int. Cl.[7] .................................................. G02B 6/00
(52) U.S. Cl. ........................ 385/134; 385/135; 385/136; 248/74.2
(58) Field of Search ................................. 385/134–137; 174/72 A; 248/68.1, 73, 74.1, 74.2

(56) References Cited

U.S. PATENT DOCUMENTS

| 5,383,318 A | 1/1995 | Kelley et al. |
| 5,530,787 A | 6/1996 | Arnett |
| 5,559,922 A | 9/1996 | Arnett |
| 5,710,855 A | 1/1998 | Konwitz |
| 5,715,348 A | * 2/1998 | Falkenberg et al. ......... 385/135 |
| 5,724,469 A | 3/1998 | Orlando |
| 5,758,004 A | 5/1998 | Alarcon et al. |
| 5,794,895 A | 8/1998 | Besserer et al. |
| 5,893,539 A | 4/1999 | Tran et al. |
| 6,278,830 B1 | * 8/2001 | Levesque et al. ........... 385/136 |

* cited by examiner

Primary Examiner—Hemang Sanghavi
(74) Attorney, Agent, or Firm—Adams, Schwartz & Evans, P.A.

(57) ABSTRACT

A cable retainer assembly is adapted for segregating, bundling, and routing fiber optic cable inside a cable management cabinet. The retainer assembly includes a mounting track for being located inside the cabinet, and having first and second opposing end edges, and first and second opposing side edges. An arcuate retainer clip is carried on the mounting track between its opposing end edges and side edges. The retainer clip defines a bend-radius control surface adapted for controlling the degree of bend experienced by fiber optic cable held by the retainer clip. The retainer clip has a base, and at least one outwardly-extending cable retainer arm formed with the base. The cable retainer arm is spaced-apart from the bend-radius control surface to retain a bundled plurality of fiber optic cable inside the cabinet.

23 Claims, 14 Drawing Sheets

FIBER OPTIC CABLE RETAINER ASSEMBLY AND CLIP WITH A BEND-RADIUS CONTROL SURFACE

TECHNICAL FIELD AND BACKGROUND OF INVENTION

This application is a continuation-in-part of U.S. Ser. No. 09/505,290, filed on Feb. 16, 2000 and entitled "Adjustable Cable Retainer Assembly". This parent application claims priority to a provisional application No. 60/120,788, filed on Feb. 19, 1999.

The invention relates generally to fiber optic cable management within an area such as a telecommunications central office, headend for fiber optic television cable, or wiring closet; and more particularly to a fiber optic cable retainer assembly and clip having a bend-radius control surface for controlling the degree of bend experienced by cable inside a cable management cabinet. The invention collects and segregates fiber optic cable within the cabinet, and is adjustable from one end of the cabinet to the other to effectively route and distribute cable ends to various connectors located inside the cabinet.

SUMMARY OF THE INVENTION

Therefore, it is an object of the invention to provide a fiber optic cable retainer clip which includes a bend-radius control surface to prevent fiber optic cable from exceeding a minimum bend radius.

It is another object of the invention to provide a fiber optic cable retainer clip which mounts on a track and is slidably adjustable along the length of the track to allow effective distribution and routing of fiber optic cable inside a cable management cabinet.

It is another object of the invention to provide a fiber optic cable retainer clip which is formed of molded plastic.

It is another object of the invention to provide a fiber optic cable retainer clip which can be used as an assembly of two like, semi-circular clip halves arranged adjacent to each other to form an annular reel, or spaced-apart from each other to accommodate a greater length of cable.

It is another object of the invention to provide a fiber optic cable retainer clip which can be used as a single, semi-circular clip half.

It is another object of the invention to provide a fiber optic cable retainer clip which can be easily repositioned within the cable management cabinet.

It is another object of the invention to provide a fiber optic cable retainer clip which can be easily removed from the cable management cabinet.

It is another object of the invention to provide a fiber optic cable retainer assembly which includes one or more fiber optic cable retainer clips.

It is another object of the invention to provide a method of segregating, bundling, and routing fiber optic cable inside a fiber optic cable management cabinet.

These and other objects of the present invention are achieved in the preferred embodiments disclosed below by providing a cable retainer assembly adapted for segregating, bundling, and routing fiber optic cable inside a cable management cabinet. The retainer assembly includes a mounting track for being located inside the cabinet, and having first and second opposing end edges, and first and second opposing side edges. An arcuate retainer clip is carried on the mounting track between its opposing end edges and side edges. The retainer clip defines a bend-radius control surface adapted for controlling the degree of bend experienced by fiber optic cable held by the retainer clip. The retainer clip has a base, and at least one outwardly-extending cable retainer arm formed with the base. The cable retainer arm is spaced-apart from the bend-radius control surface to retain a bundled plurality of fiber optic cable inside the cabinet.

According to another preferred embodiment of the invention, clip adjustment means are provided for adjusting the location of the retainer clip on the track.

According to yet another preferred embodiment of the invention, the track includes first and second laterally-spaced mounting rails extending longitudinally from one end edge of the track to the other. The retainer clip includes first and second resilient, spaced-apart pinch grips having respective mounting feet frictionally engaging the mounting rails of the track to hold the retainer clip in a fixed position on the track. The pinch grips are adapted for being gripped by a user and pinched together to disengage the mounting feet from the mounting rails such that the position of the retainer clip on the track is slidably adjustable along a length of the track from one end edge to the other.

According to yet another preferred embodiment of the invention, the resilient pinch grips extend radially outwardly from a surface of the retainer clip opposite the bend-radius control surface.

According to yet another preferred embodiment of the invention, the mounting rails of the track and the mounting feet of the pinch grips include respective interfering shoulders cooperating to releasably lock the retainer clip onto the track.

According to yet another preferred embodiment of the invention, the mounting track includes first and second laterally-spaced guide rails extending from one end edge of the track to the other. The clip includes respective guide channels formed with the base and receiving the guide rails of the mounting track.

According to yet another preferred embodiment of the invention, the retainer arm is generally L-shaped, and includes a first arm portion spaced-apart from the bend-radius control surface and extending generally perpendicular to a surface of the base, and a second arm portion integrally formed with the first arm portion. The second arm portion extends inwardly towards the bend-radius control surface generally parallel to the surface of the base.

According to yet another preferred embodiment of the invention, a free end of the cable retainer arm is turned upwardly to facilitate placement of fiber optic cable between the cable retainer arm and the bend-radius control surface of the retainer clip.

According to yet another preferred embodiment of the invention, an alignment is key formed with the retainer clip and is adapted for being received into a complementary alignment slot of a second retainer clip mounted on the mounting track adjacent the first retainer clip.

According to yet another preferred embodiment of the invention, an alignment slot is formed with the retainer clip and adapted for receiving a complementary alignment key of a second retainer clip mounted on the mounting track adjacent the first retainer clip.

According to yet another preferred embodiment of the invention, a resilient fitting extends outwardly along a circumference of the base of the retainer clip and is adapted for being received into a complementary catch of a second retainer clip mounted on the mounting track adjacent the first retainer clip.

According to yet another preferred embodiment of the invention, a catch is formed with the base of the retainer clip proximate a circumference of the base and is adapted for receiving a complementary resilient fitting of a second retainer clip mounted on the mounting track adjacent the first retainer clip.

According to yet another preferred embodiment of the invention, a retainer clip includes a base and an arcuate inner wall formed with and extending outwardly from the base. The inner wall defines a bend-radius control surface adapted for controlling the degree of bend experienced by fiber optic cable carried by the retainer clip. At least one outwardly-extending cable retainer arm is formed with the base and is spaced-apart from the bend-radius control surface to retain a bundled plurality of fiber optic cable inside the cabinet.

In another embodiment, the invention is a method of segregating, bundling, and routing fiber optic cable inside a fiber optic cable management cabinet. The method includes the steps of locating a mounting track inside the cabinet. The mounting track has first and second opposing end edges, and first and second opposing side edges. An arcuate retainer clip is then attached to the track between its opposing end edges and side edges. The retainer clip defines a bend-radius control surface adapted for controlling the degree of bend experienced by fiber optic cable carried by the retainer clip. The position of the retainer clip on the mounting track is then adjusted by sliding the retainer clip along the length of the mounting track to a desired location.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
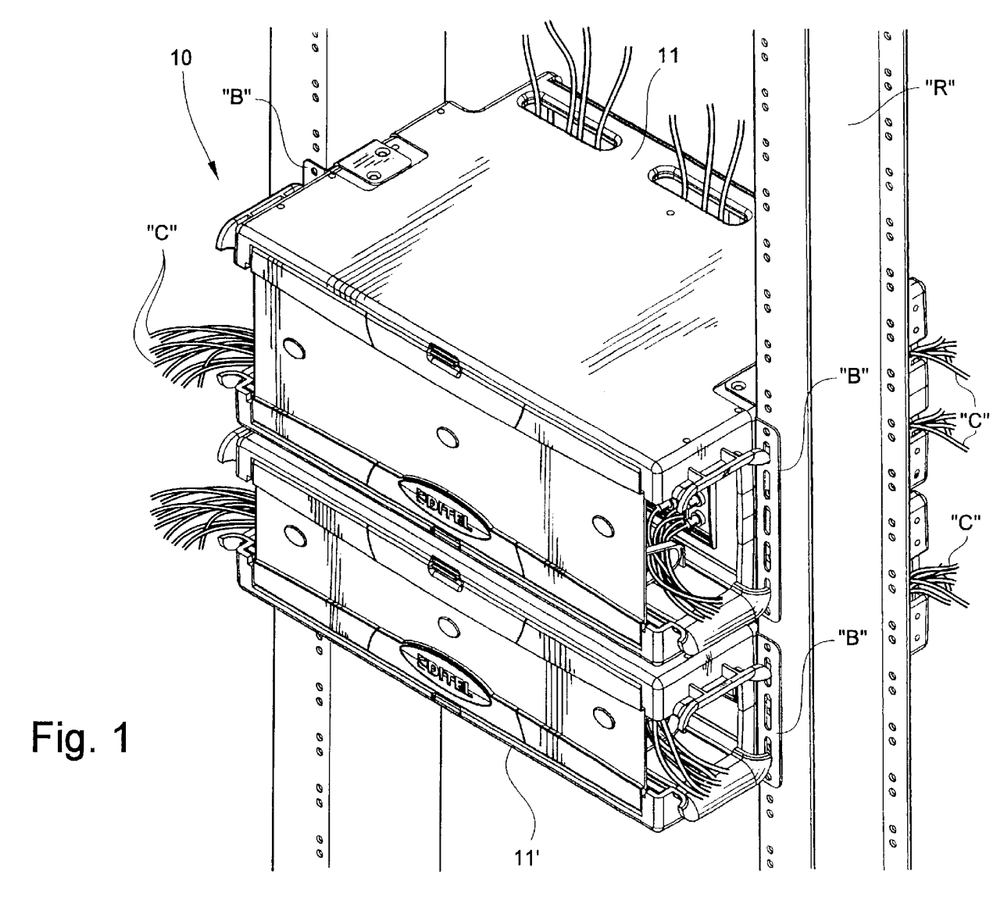
FIG. 1 is a perspective view of a fiber optic cable management system including a pair of stacked, modular cable management cabinets assembled according to one preferred embodiment of the invention.

Referring now specifically to the drawings, a fiber optic cable management system according to the present invention is illustrated in FIG. 1 and shown generally at reference numeral 10. The system 10 has particular application in the telecommunications industry for managing the connection, storage, and distribution of fiber optic cable "C" in a central office. The system 10 includes a number of modular cable management cabinets 11 and 11' with respective mounting brackets "B" used for mounting the cabinets to vertical support racks "R". The system 10 may further include one or more cable storage or splice cabinets (not shown). A single cabinet 11 is described below.

As shown in FIGS. 2–5, the cabinet 11 is formed of identical molded top and bottom sections 14 and 15, a transparent front door 16, and a rear door 17. Each of the top and bottom cabinet sections 14 and 15 includes complementary, integrally-formed side walls 21, 22 and 23, 24, respectively. The side walls 21, 22, 23, and 24 cooperate with respective spacers 25A, 25B and 26A, 26B to form opposing sides of the cabinet 11, and to define a number of cable access openings 27, 28, 29, 30, 31, and 32 for receiving and distributing fiber optic cable to and from the cabinet 11. The front access openings 27 and 28 include respective trumpet flanges 34A, 34B and 35A, 35B curved outwardly to control the bend radius of cable exiting the cabinet 11. The optimal minimum bend radius achieved in the present system 10 no less than 2 inches. Additional cable access openings 37, 38, 39, 40, 41, and 42 are formed in the top and bottom cabinet sections to allow convenient cable patching from one cabinet 11 to another. The cabinet 11 is held together using suitable fasteners, such as screws (not shown). The screws pass through openings in respective inwardly-turned ends of mounting brackets "B" and through openings formed in the spacers 25A, 25B and 26A, 26B and top and bottom cabinet sections 14 and 15. The cabinet 11 is formed using pairs of stacked spacers 25A, 25B and 26A, 26B at each side. A smaller cabinet 11', also shown in FIG. 1, is formed using only single spacers at each side. All other features and components of cabinet 11' are identical to that of cabinet 11.

Figure 2:
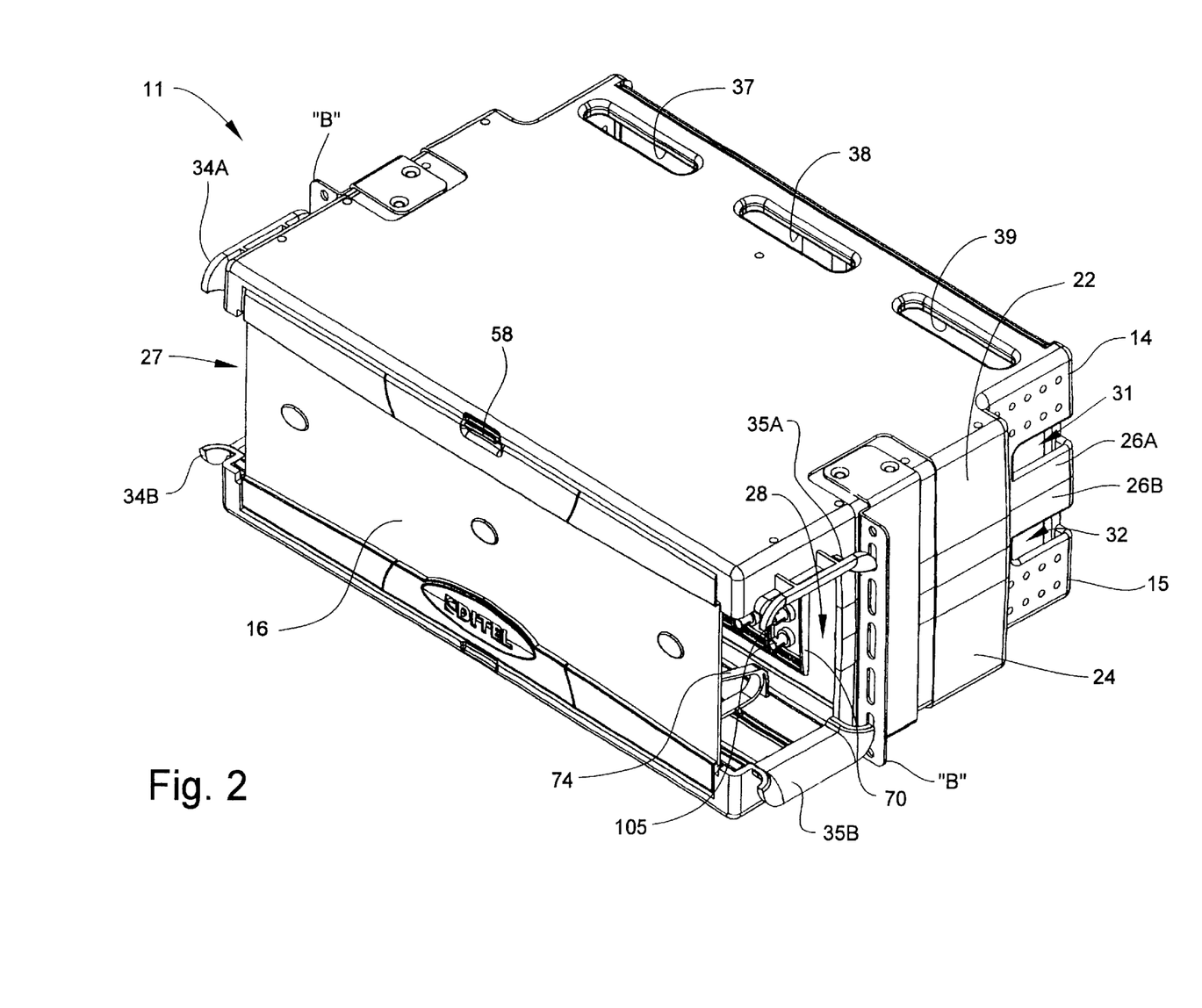
FIG. 2 is a front perspective view of a single cabinet with the front and rear doors closed, and the fiber optic cable removed for clarity.
Figure 3:
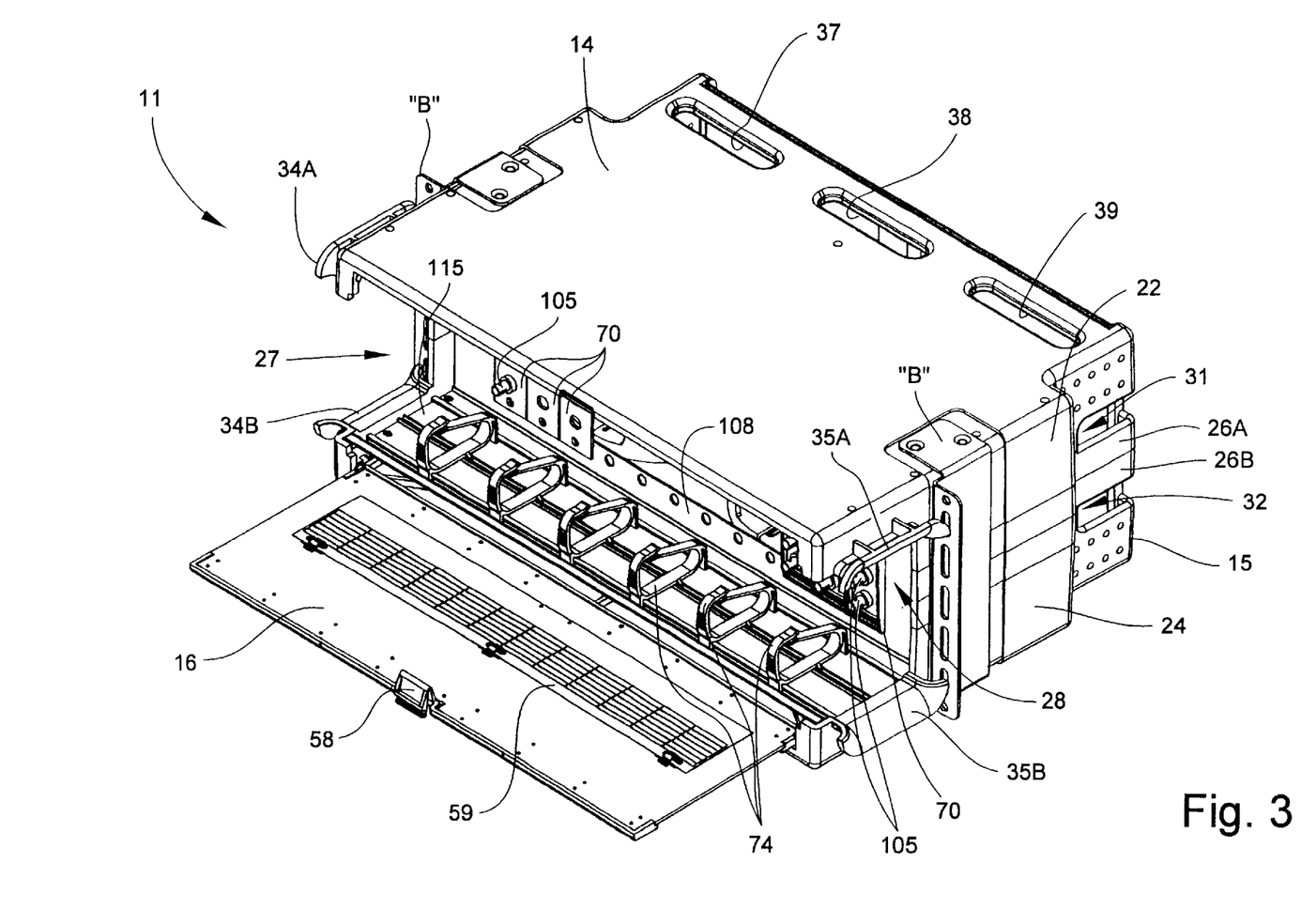
FIG. 3 is a front perspective view of the cabinet with the front door open to show interior components of the cabinet, particularly the adjustable front clips.
Figure 6:
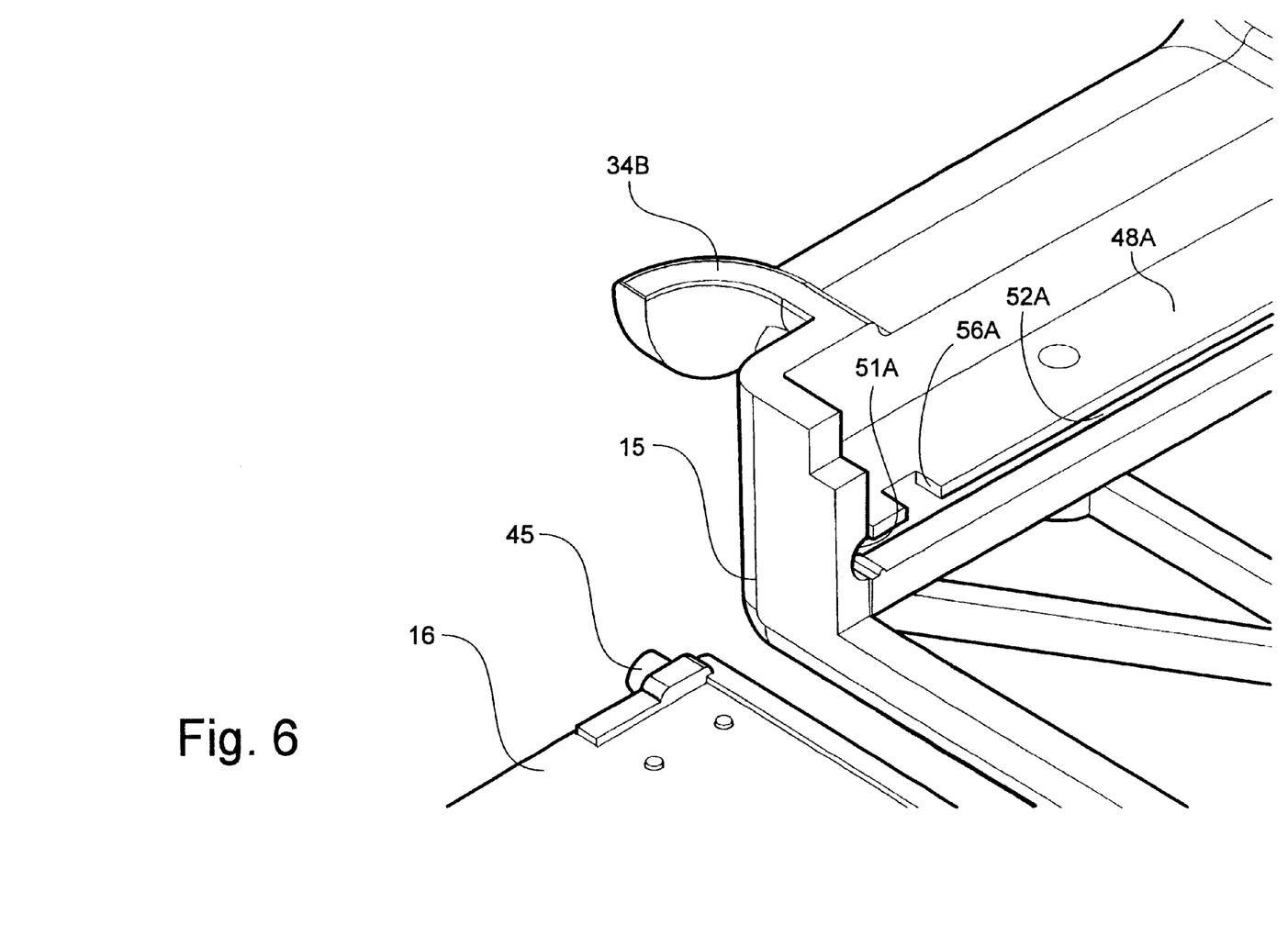
FIG. 6 is an enlarged, fragmentary perspective view of the cabinet with the front door removed.
Figure 7:
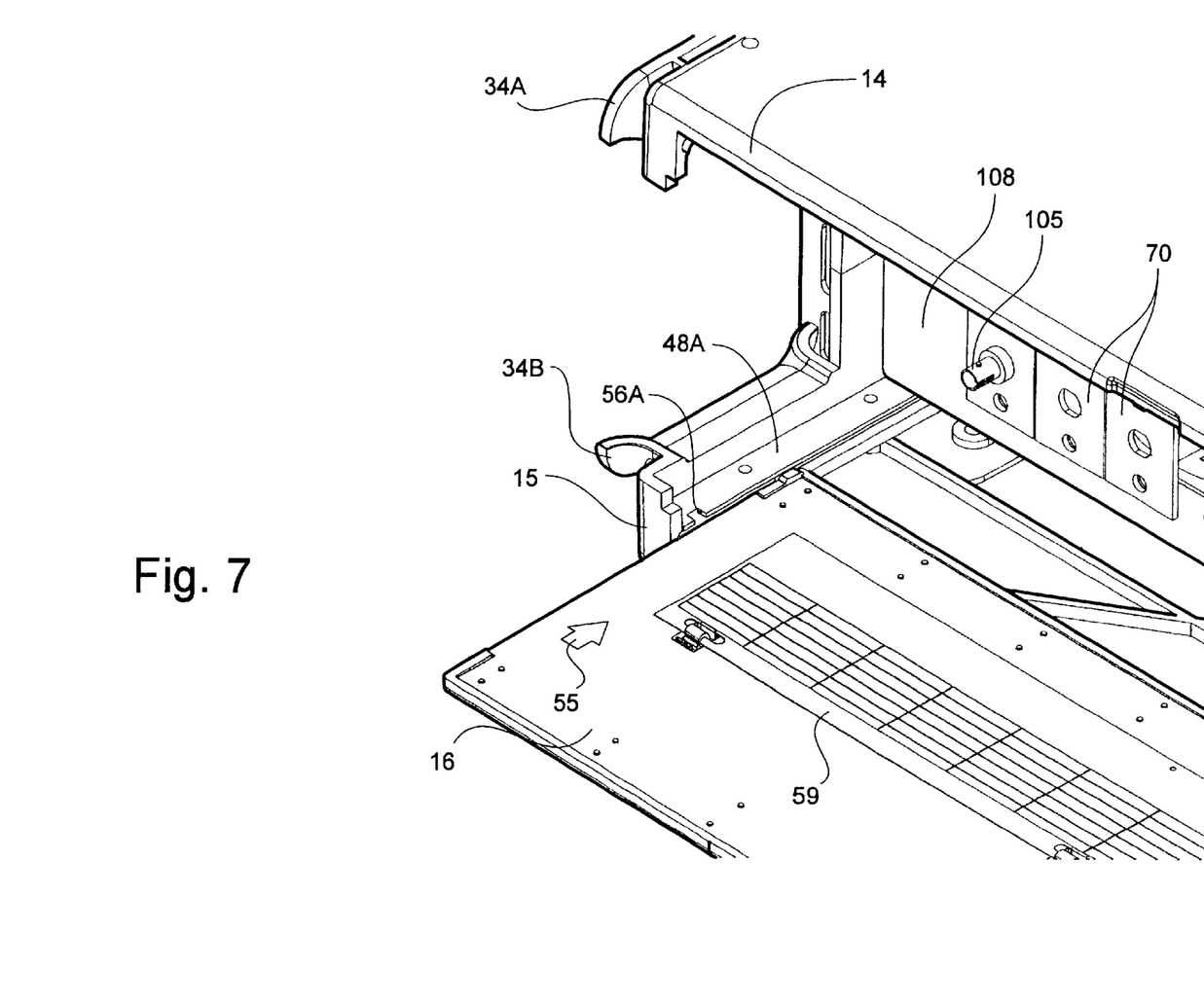
FIG. 7 is fragmentary perspective view of the cabinet showing the front door being moved inwardly into the hidden position inside the cabinet and adjacent the floor of the bottom cabinet section.

The front door 16 of cabinet 11 is pivotably attached at a front edge of the bottom cabinet section 15, and is adapted to move between closed and open positions, shown in FIGS. 2 and 3, respectively, and a hidden position (not shown) within the cabinet 11. The front door 16 includes opposing, outwardly projecting pins 45 and 46, shown in FIG. 5, which extend into respective spaced door rails 48A and 48B mounted to the bottom cabinet section 15. As best shown in FIG. 6, each rail 48A, 48B has an integrally-formed front bearing 51A, 51B (only 51A shown) within which the pin 45, 46 rotates as the door 16 pivots open and closed, and a longitudinal groove 52A, 52B (only 52A shown) extending from the bearing 51A, 51B to an opposite end of the rail 48A, 48B. The bearing 51B and groove 52B for rail 48B is identical to that shown on rail 48A. Once moved to the open position generally parallel to the floor of the bottom cabinet section 15, the front door 16 slides inwardly to the hidden position within the cabinet 11 by gently pushing the door 16 in the direction indicated by arrow 55 in FIG. 7. The pins 45, 46 move out of their respective bearings 51A, 51B and along the grooves 52A, 52B of rails 48A, 48B as the front door 16 slides inside the cabinet 11. Alternatively, the front door 16 is conveniently detached from the cabinet 11 by pushing the door 16 slightly inwardly when in the open position to align the pins 45, 46 with respective notches 56A, 56B formed in the door rails 48A, 48B, and then lifting the door 16 upwardly to remove the pins 45, 46 from the grooves 52A, 52B. The front door 16 is reattached to the cabinet 11 in a reverse manner. Preferably, a closing mechanism 58 is provided for releasably holding the front door 16 closed. In addition, a user chart 59 may be attached to an inside surface of the front door 16 for making written notes.

Figure 4:
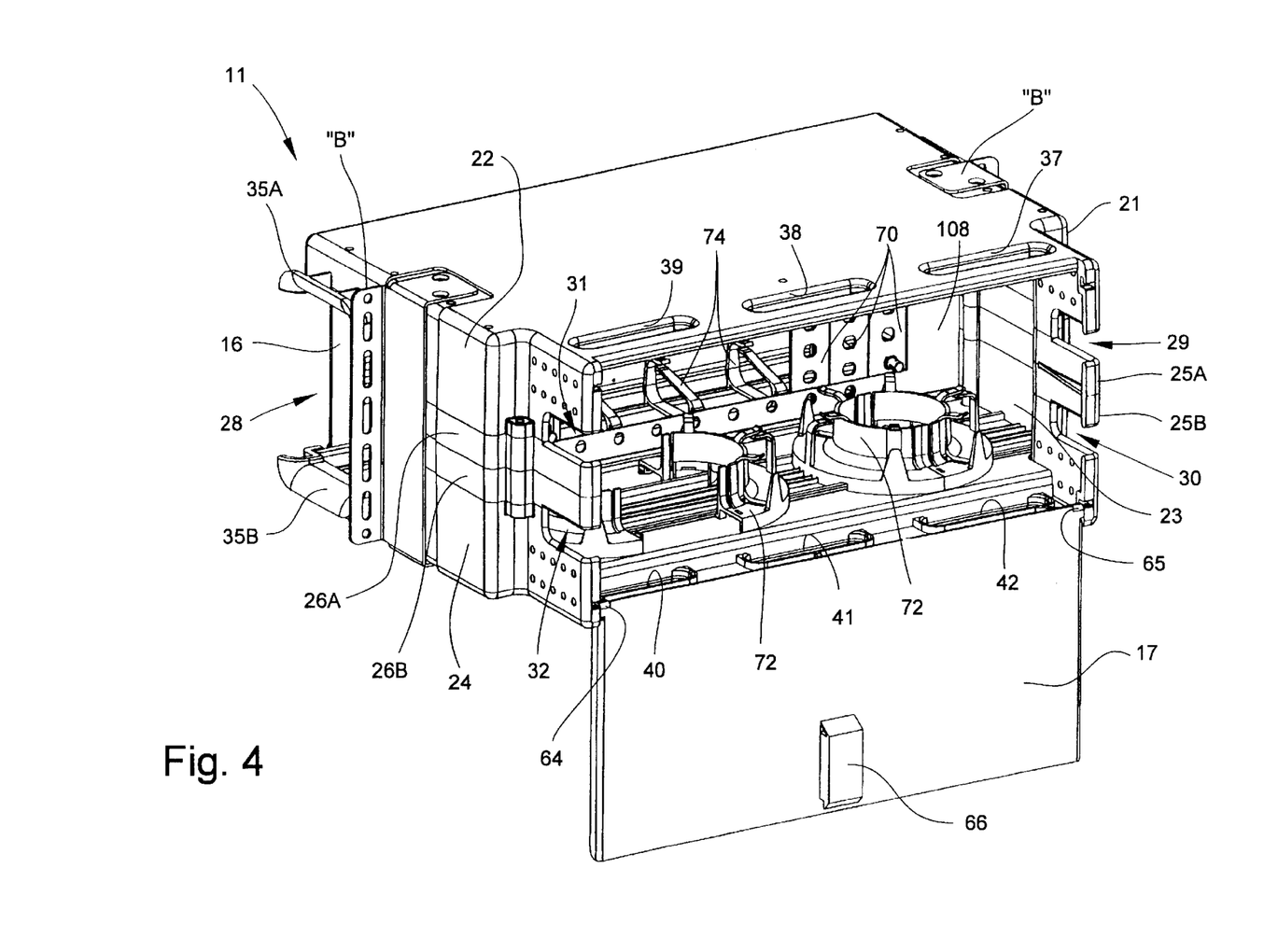
FIG. 4 is rear perspective view of the cabinet with the rear door open to further show interior components of the cabinet, particularly the adjustable rear clips.
Figure 5:
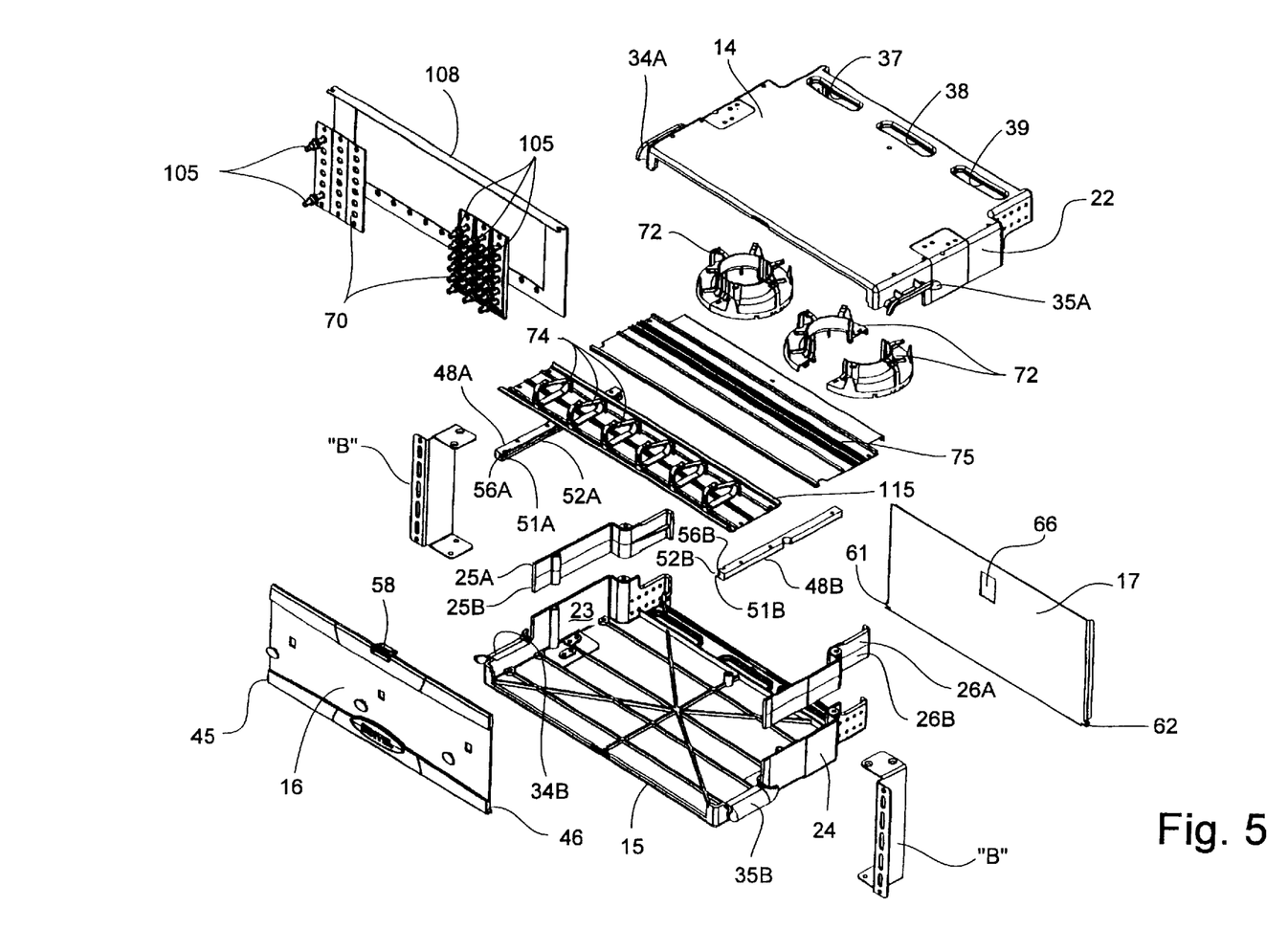
FIG. 5 is an exploded, perspective view of the cabinet.

The rear door 17 of the cabinet 11 is pivotably attached to a rear edge of the bottom section 15 for movement between the closed position shown in FIGS. 2 and 3, and an open position shown in FIG. 4. The rear door 17 includes opposing, outwardly projecting pins 61, 62 extending within respective rear bearings 64, 65 formed with the bottom cabinet section 15. In the open position, the rear door 17 extends downwardly approximately 180 degrees from its closed position. A second closing mechanism 66 is provided for releasably holding the rear door 17 closed.

Figure 8:
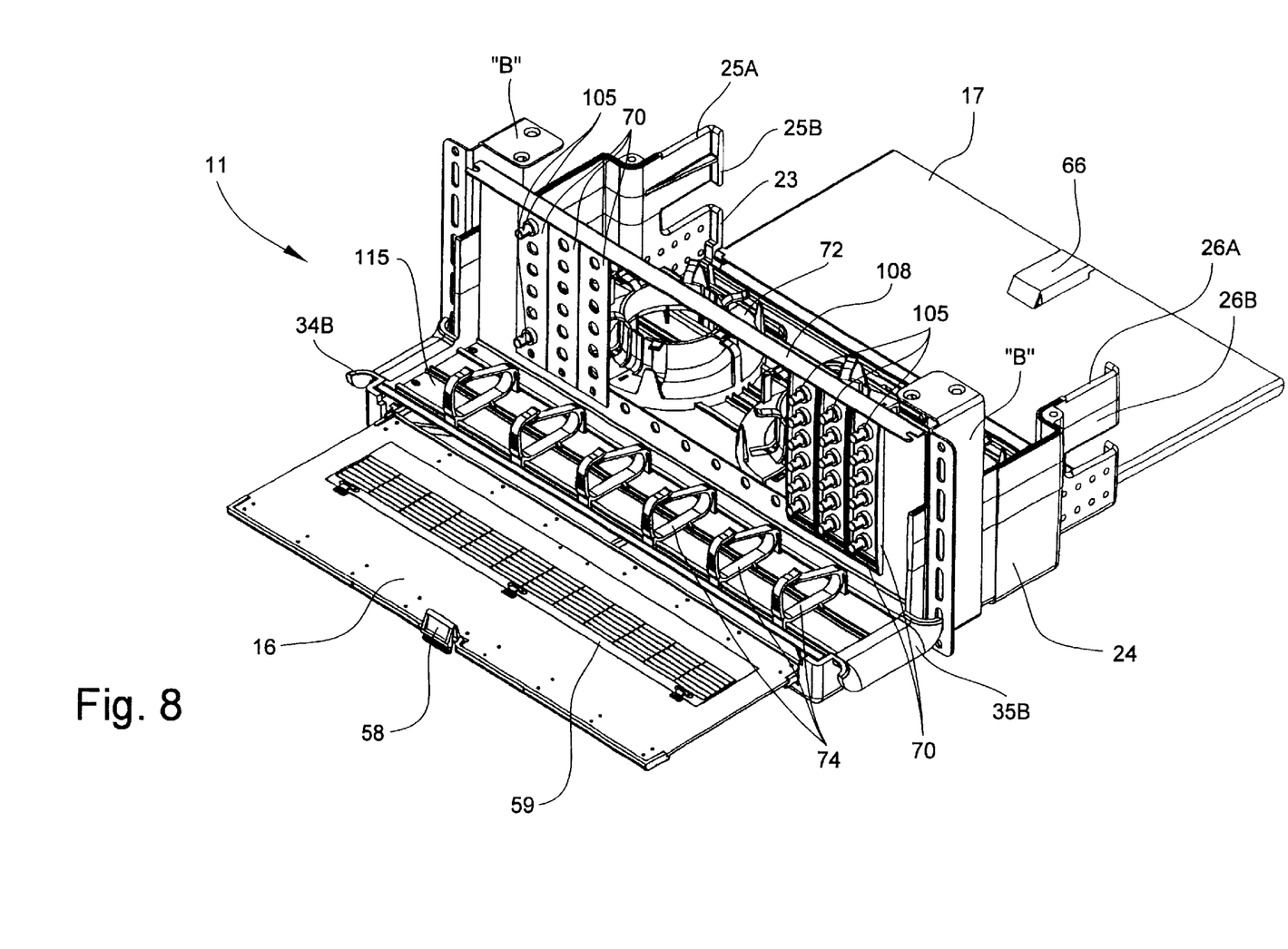
FIG. 8 is a front perspective view of the cabinet with the top cabinet section removed to illustrate interior components of the cabinet.
Figure 9:
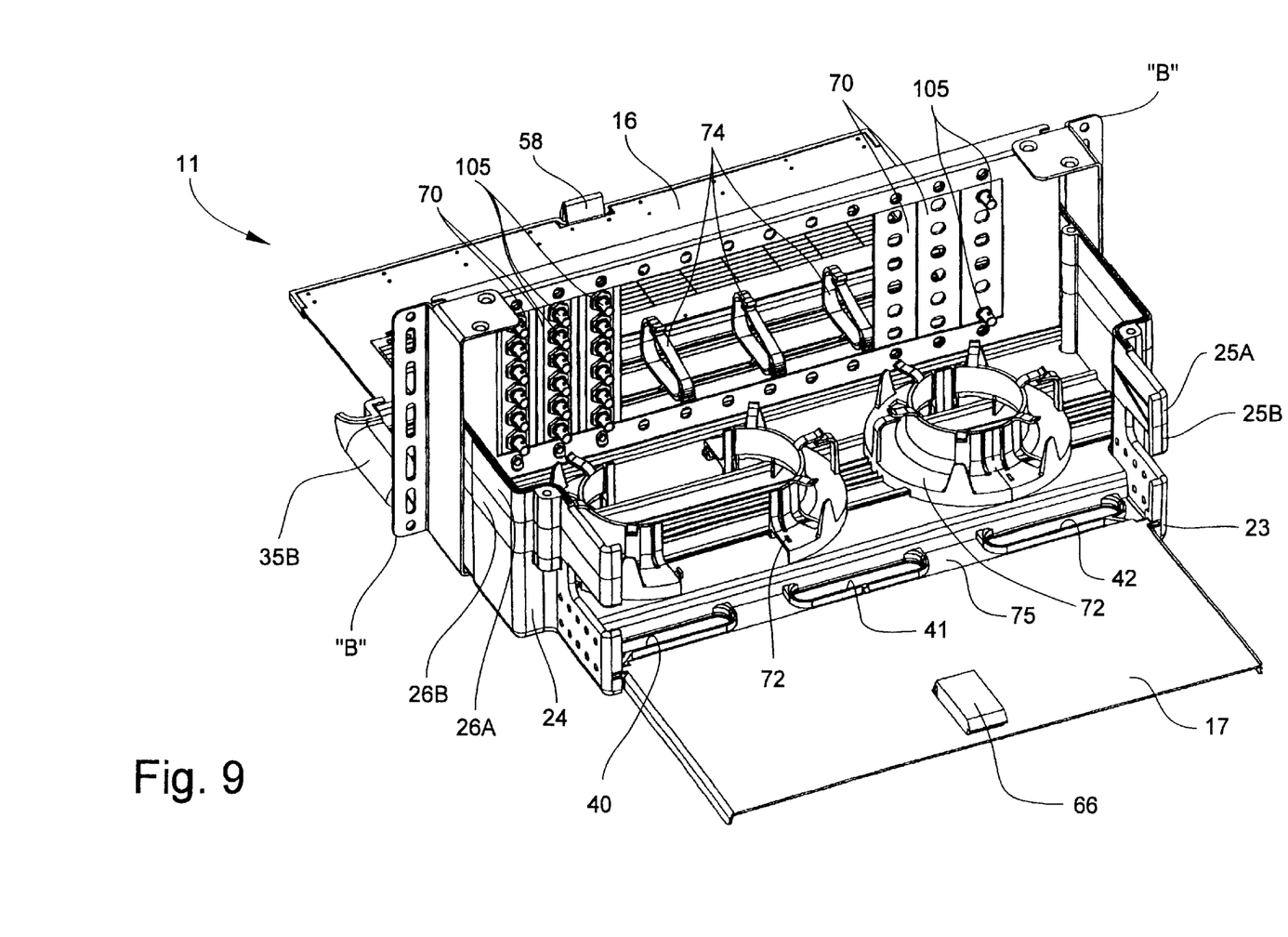
FIG. 9 is a rear perspective view of the cabinet with the top cabinet section removed.

Referring now to FIGS. 8 and 9, the interior of the cabinet 11 includes a number of connector plates 70 for interconnecting ends of fiber optic cable entering and exiting the cabinet 11. One or more spaced, adjustable rear clips 72 are mounted to the rear of the connector plates 70 for collecting and segregating fiber optic cable entering the cabinet 11 through rear access openings 29, 30, 31, and 32 (See FIG. 4). A number of adjustable front clips 74 are mounted to the front of the connector plates 70, and serve to route and segregate cables exiting the cabinet 11 through front access openings 27 and 28 (See FIG. 3). The rear clip 72 of the cabinet 11 is described further below.

Rear Clip 72

Figure 10:
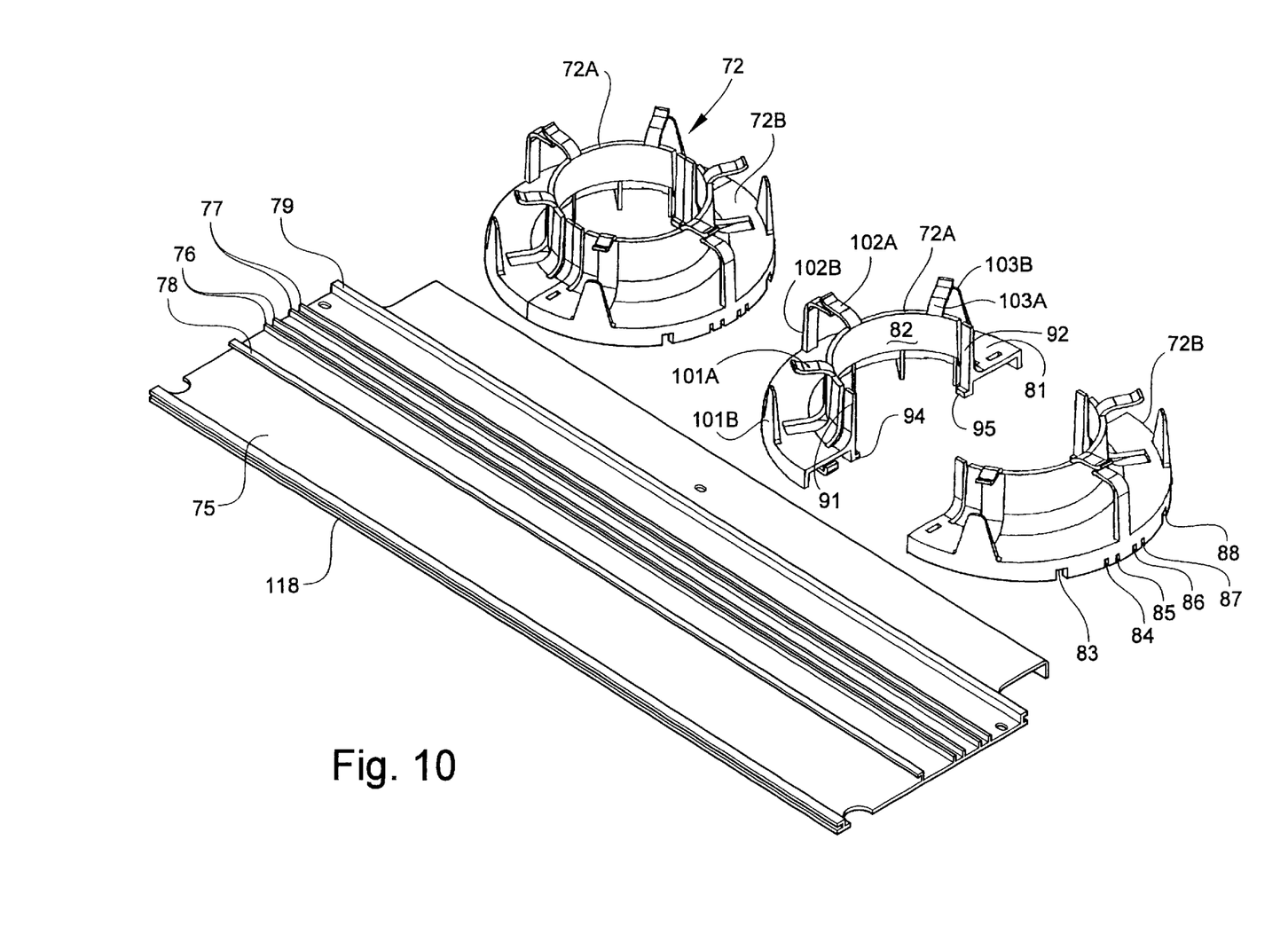
FIG. 10 is perspective view of the rear clips and mounting track with the rear clips detached.
Figure 11:
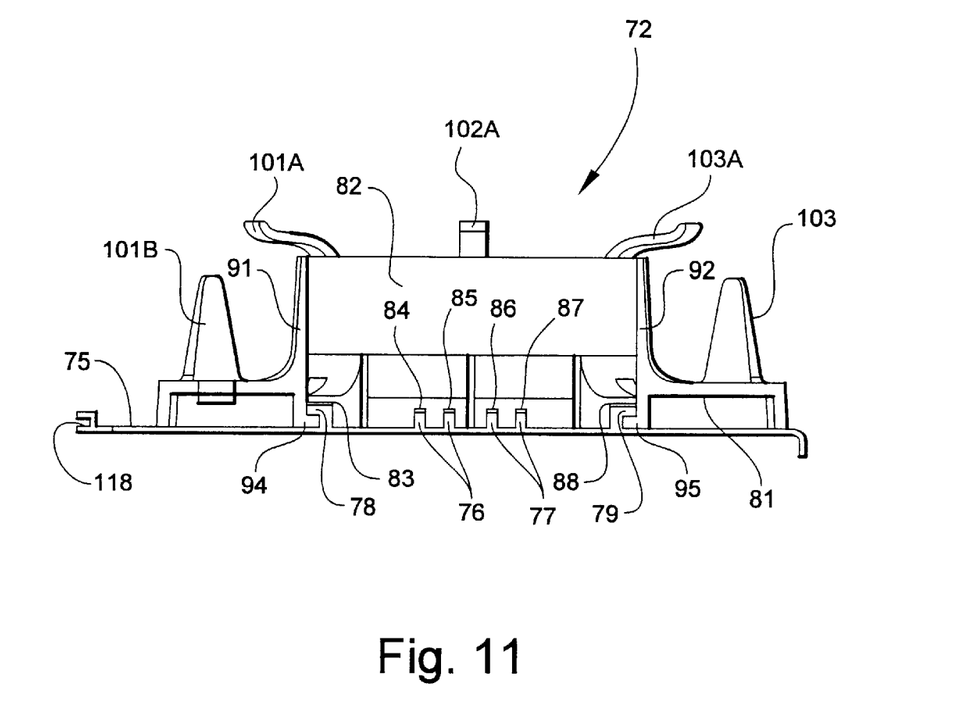
FIG. 11 is a side elevational view showing the rear clip attached to the mounting track.
Figure 12:
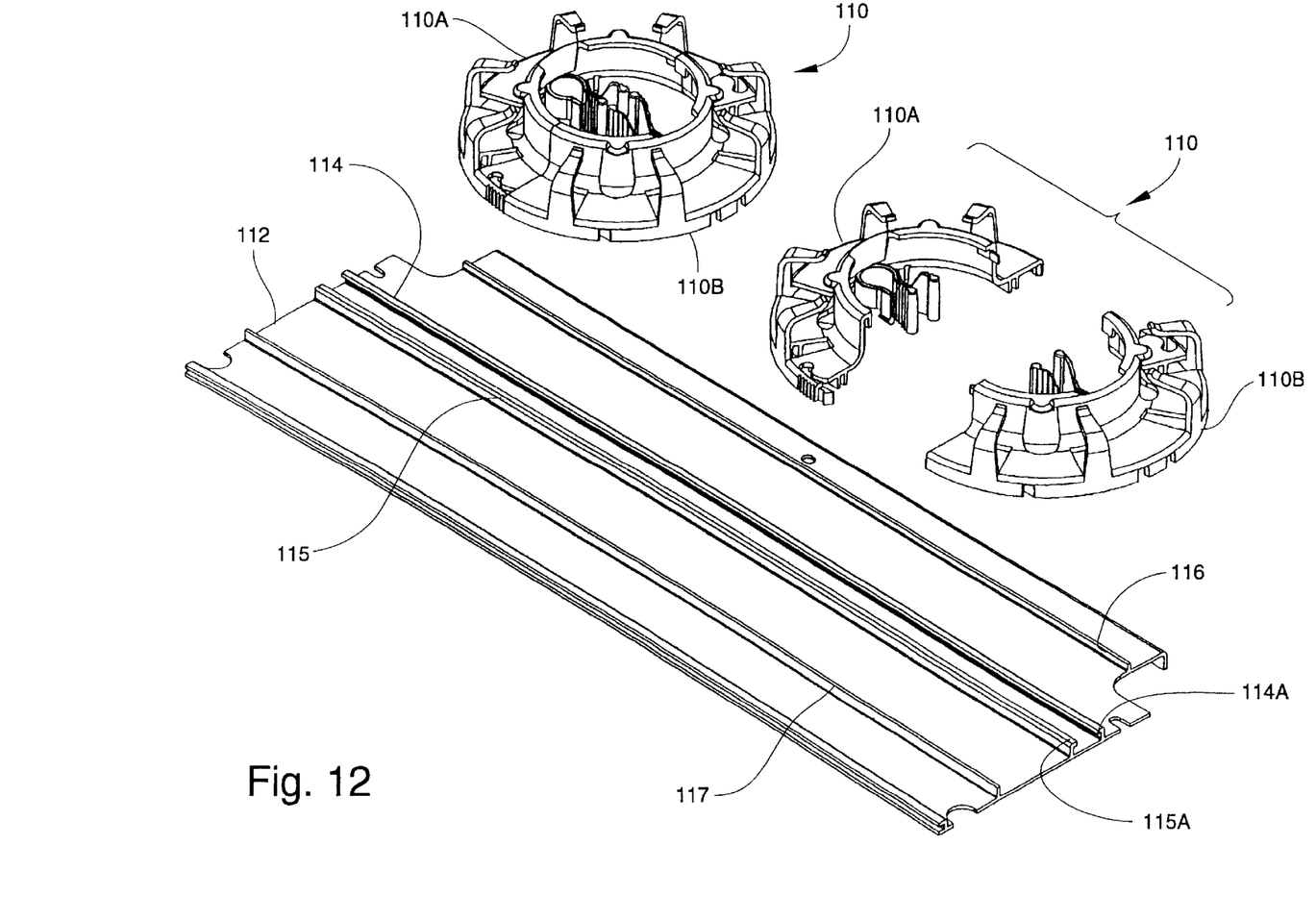
FIG. 12 is perspective view of the rear clips and mounting track according to a further preferred embodiment of the invention and showing the rear clips detached from the track.
Figure 13:
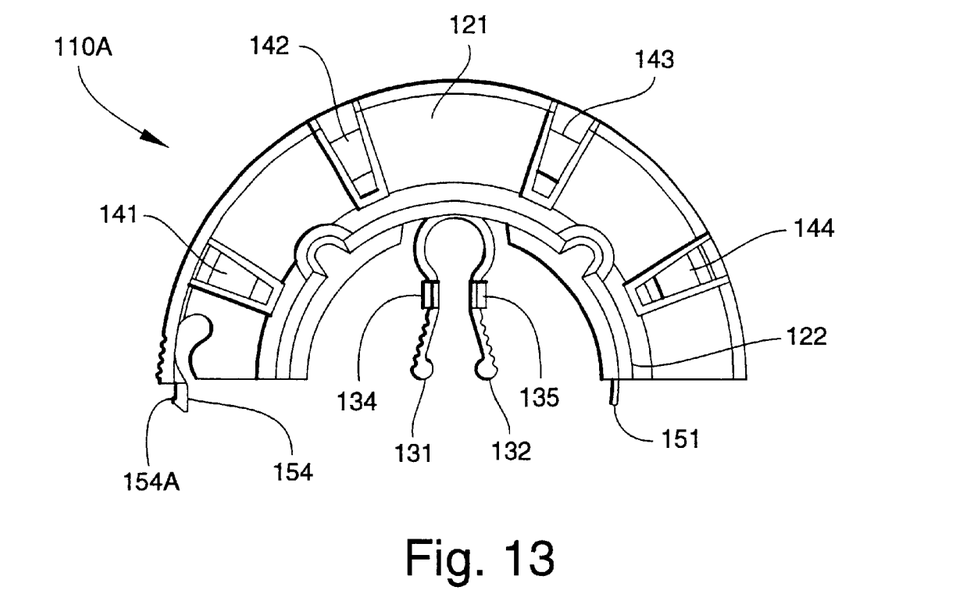
FIG. 13 is a top plan view of the retainer clip half.
Figure 14:
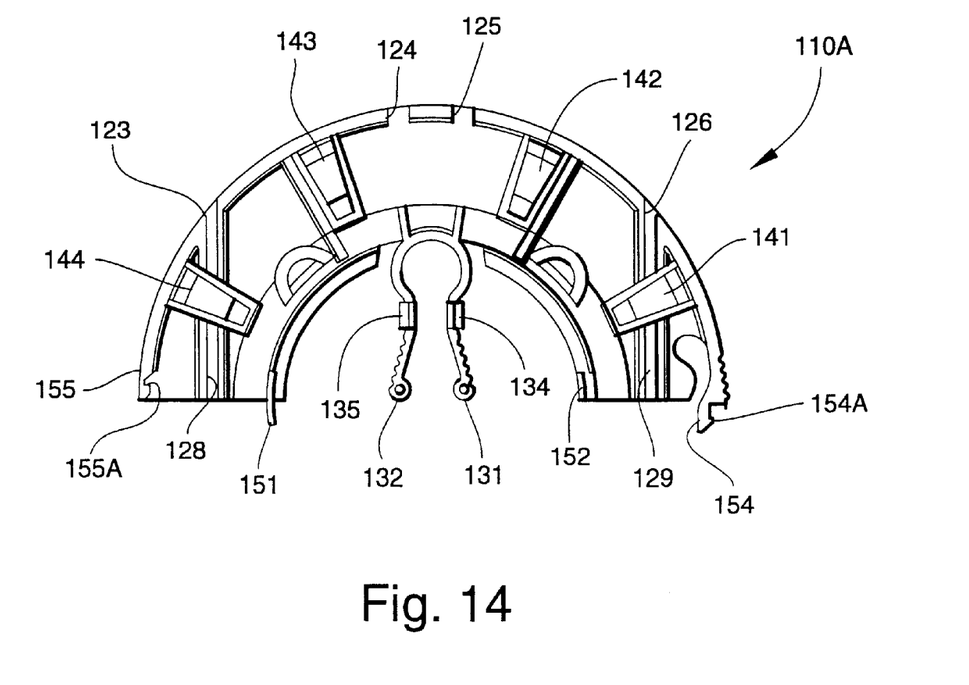
FIG. 14 is a bottom plan view of the retainer clip half.
Figure 15:
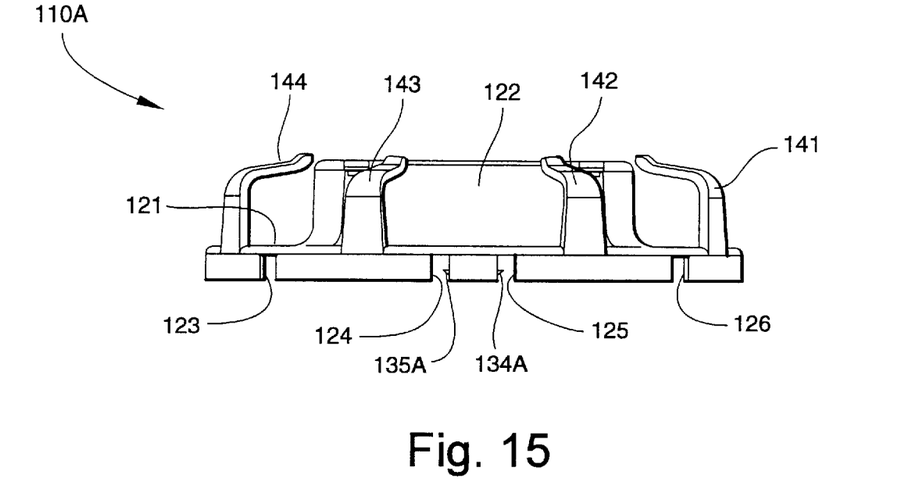
FIG. 15 is an outside view of the retainer clip half.
Figure 16:
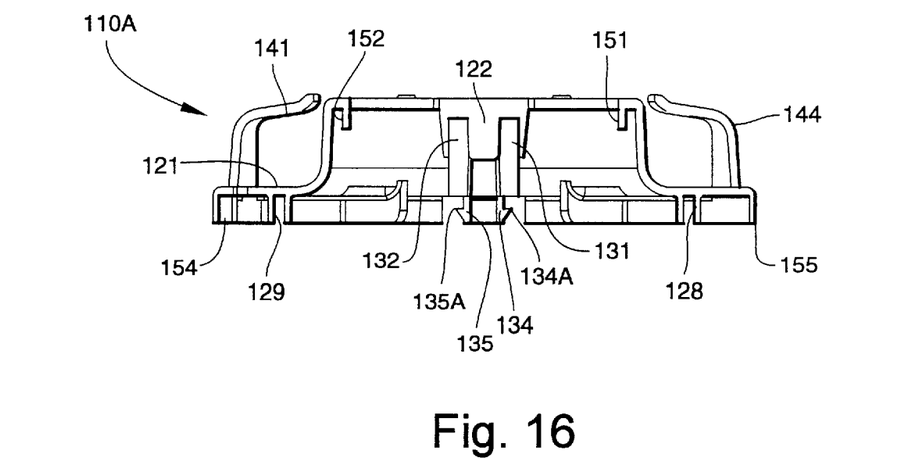
FIG. 16 is an inside view of the retainer clip half.
Figure 17:
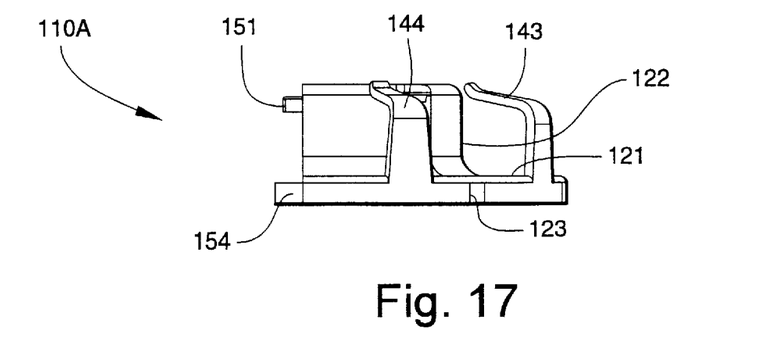
FIG. 17 is a side view of the retainer clip half.

As shown in FIGS. 10 and 11, the rear clip 72 is formed in two identical, arcuate halves 72A and 72B attached separately to a rear mounting track 75 secured to the floor of the bottom cabinet section 15. The mounting track 75 includes two sets of inner longitudinal guide rails 76 and 77 and two outer longitudinal mounting rails 78 and 79. Each half 72A, 72B includes a base 81 for engaging the track 75, and an integrally-formed upwardly-turned inner wall 82. The base 81 has a series of notches 83, 84, 85, 86, 87, and 88 formed along its outer peripheral edge for accommodating the rails 76–79 of the track 75, as shown in FIG. 11, and first and second flexible legs 91 and 92 extending upwardly adjacent the inner wall 82 at opposite ends of the clip half 72A, 72B. The vertical legs 91, 92 include respective inward extending mounting feet 94, 95 adapted to frictionally engage the track 75 along the mounting rails 78, 79. The mounting rails 78, 79 have corresponding outward extending shoulders 96, 97 which cooperate with the feet 94, 95 to prevent the clip halves 72A, 72B from inadvertently pulling off the track 75 when in use. The clip halves 72A, 72B are repositioned along or removed from the track 75 by the user by simultaneously squeezing the top ends of the legs 91, 92 towards each other using the thumb and forefinger to flex the feet 94, 95 out of engagement with the mounting rails 78, 79.

When brought together on the track 75, the two halves 72A, 72B cooperate to form an annular reel for collecting excess fiber optic cable fed into the cabinet 11 to the connector plates 70. For accommodating greater lengths of excess cable, the two halves 72A, 72B can be readily separated and spread apart along the length of the track 75. Alternatively, each half 72A, 72B may be used separately to segregate and feed cable directly to one or more selected connector plates 70. The curved inner walls 82 of the clip halves 72A, 72B are designed to prevent the cable from exceeding the minimum 2-inch bend radius requirement.

The cable is held within the rear clip 72 by pairs of cooperating, flexible retainer arms 101A, 101B, 102A, 102B, and 103A, 103B extending radially outward from a top edge of the inner wall 82 and upwardly from an outer edge of the base 81, respectively. Each of the top arms 101A, 102A, and 103A includes a slight upwardly-turned free end to facilitate placement of the cable within the clip halves 72A, 72B. The bottom arms 101B and 103B located at each end of the clip half 72A, 72B are relatively stiff and wide to provide increased control of the bend of the cable around the inner wall 82. The middle bottom arm 102B is narrower, longer and more flexible, and serves primarily to bundle the cable together.

Retainer Clip 110

A further embodiment of a cable retainer clip 110 according to the invention is shown in FIGS. 12 through 17. The retainer clip 110 is preferably formed in two identical, arcuate halves 110A and 110B attached separately to a rear mounting track 112 secured to the floor of the bottom cabinet section, as previously described. The mounting track 112 includes two inner longitudinal mounting rails 114 and 115 and two outer longitudinal guide rails 116 and 117.

A single retainer clip half 110A is described with reference to FIGS. 13–17; it being understood that the clip halves 110A and 110B are identical. The clip half 110A includes a base 121 positioned on the track 112, and an integrally-formed upwardly-turned inner wall 122. The inner wall 122 defines a cable bend-radius control surface adapted for controlling the degree of bend experienced by fiber optic cable retained by the retainer clip half 110A. The bend-radius control surface is designed to prevent cable from exceeding the minimum 2-inch bend radius requirement.

The base 121 of the clip half 110A has a series of notches 123, 124, 125, and 126 formed along its outer circumference to accommodate the rails 114, 115, 116, and 117 of the track 112. Channels 128 and 129 are formed with an underside of the base 121 and extend from respective notches 123 and 126 to receive the guide rails 116 and 117.

A pair of spaced-apart, flexible, resilient pinch grips 131 and 132 extend radially outwardly from the inner wall 122 opposite the bend-radius control surface, and include respective mounting feet 134 and 135 which frictionally engage the mounting rails 114 and 115 of the track 112 to hold clip half 110A in a releasably fixed position on the track 112. The pinch grips 131 and 132 are adapted for being gripped by a user and pinched together to disengage the mounting feet 134 and 135 from the mounting rails 114 and 115 such that the position of the clip half 110A on the track 112 is slidably adjustable along a length of the track 112 from one end edge to the other. When the pinch grips 131 and 132 are released, the mounting feet 134 and 135 re-engage the mounting track to fix the position of the retainer clip half 110A. Preferably, the mounting rails 114, 115 of the track 112 and mounting feet 134, 135 of the pinch grips 131, 132 include respective interfering shoulders 114A, 115A and 134A, 135A which cooperate to prevent the retainer clip half 110A from inadvertently pulling off the track 112 when in use.

The retainer clip half 110A further includes a number of flexible, generally L-shaped, outer retainer arms 141, 142, 143, and 144 positioned around the outer circumference of the base 121 for holding and segregating fiber optic cable. Each retainer arm 141–144 includes a first arm portion spaced-apart from the inner wall 122 and extending generally perpendicular to a surface of the base 121, and a second arm portion integrally formed with the first arm portion and extending inwardly towards the arcuate inner wall 122 generally parallel to the surface of the base 121. The free end of each retainer arm 141–144 is preferably turned slightly upwardly to facilitate placement of cable within the clip half 110A between the arcuate inner wall 122 and outer retainer arms 141–144.

When brought together on the track 112, the retainer clip halves 110A and 110B cooperate to form an annular reel (See FIG. 12) for collecting excess fiber optic cable fed into the cable management cabinet to the connector plates. Each clip half 110A, 110B has a complementary alignment key 151 and slot 152 formed with the inner wall 122, and adapted for mating with the corresponding alignment key 151 and slot 152 of an adjacent clip half 110A, 110B mounted on the track 112. Preferably, each clip half 110A, 110B further includes a complementary resilient fitting 154 and catch 155 formed with the outer perimeter portion of the base 121, and adapted for mating with the corresponding fitting 154 and catch 155 of the adjacent clip half 110A, 110B to releasably lock the clip halves together. The fitting 154 snap-fits into the catch 155 to engage interfering shoulders 154A and 155A. To separate the clip halves 110A, 110B, the user presses inwardly on each fitting 154 to disengage the interfering shoulders 154A, 155A, and then moves the clip halves 110A, 110B apart along the mounting track 112. With the clip halves 110A, 110B spread apart, the retainer clip 110 is best suited for holding greater lengths of excess cable. Alternatively, each retainer clip half 110A, 110B may be used separately to segregate and feed cable directly to one or more selected connector plates.

An arcuate cable retainer assembly for use in a fiber optic cable management system is described above. Various details of the invention may be changed without departing from its scope. Furthermore, the foregoing description of the preferred embodiment of the invention and the best mode for practicing the invention are provided for the purpose of illustration only and not for the purpose of limitation.

We claim:

1. A cable retainer assembly adapted for segregating, bundling, and routing fiber optic cable inside a cable management cabinet, said retainer assembly comprising:
   (a) a mounting track for being located inside the cabinet, and having first and second opposing end edges, and first and second opposing side edges; and
   (b) an arcuate retainer clip carried on said track between the opposing end edges and side edges thereof, and defining a bend-radius control surface adapted for controlling the degree of bend experienced by fiber optic cable carried by said retainer clip, said retainer clip having a base, and at least one outwardly-extending cable retainer arm formed with said base and spaced-apart from said bend-radius control surface to retain a bundled plurality of fiber optic cable therebetween inside the cabinet.

2. A cable retainer assembly according to claim 1, comprising clip adjustment means for adjusting the location of said retainer clip on said track.

3. A cable retainer assembly according to claim 1, wherein said track includes first and second laterally-spaced mounting rails extending longitudinally from one end edge of said track to the other, and wherein said retainer clip comprises first and second resilient, spaced-apart pinch grips having respective mounting feet frictionally engaging the mounting rails of said track to hold said retainer clip in a fixed position on said track, said pinch grips adapted for being gripped by a user and pinched together to disengage the mounting feet from the mounting rails such that the position of said retainer clip on said track is slidably adjustable along a length of said track from one end edge thereof to the other.

4. A cable retainer assembly according to claim 3, wherein said resilient pinch grips extend radially outwardly from a surface of said retainer clip opposite the bend-radius control surface.

5. A cable retainer assembly according to claim 3, wherein the mounting rails of said track and the mounting feet of said pinch grips include respective interfering shoulders cooperating to releasably lock said retainer clip onto said track.

6. A cable retainer assembly according to claim 1, wherein said mounting track includes first and second laterally-spaced guide rails extending from one end edge of said track to the other, and wherein said clip comprises respective guide channels formed with the base and receiving the guide rails of said mounting track.

7. A cable retainer assembly according claim 1, wherein said retainer arm is generally L-shaped, and includes a first arm portion spaced-apart from the bend-radius control surface and extending generally perpendicular to a surface of the base, and a second arm portion integrally formed with the first arm portion and extending inwardly towards the bend-radius control surface generally parallel to the surface of the base.

8. A cable retainer assembly according to claim 7, wherein a free end of said cable retainer arm is turned upwardly to facilitate placement of fiber optic cable between said cable retainer arm and the bend-radius control surface of said retainer clip.

9. A cable retainer assembly according to claim 1, and comprising an alignment key formed with said retainer clip and adapted for being received into a complementary alignment slot of a second retainer clip mounted on said mounting track adjacent said first retainer clip.

10. A cable retainer assembly according to claim 1, and comprising an alignment slot formed with said retainer clip and adapted for receiving a complementary alignment key of a second retainer clip mounted on said mounting track adjacent said first retainer clip.

11. A cable retainer assembly according to claim 1, and comprising a resilient fitting extending outwardly along a circumference of the base of said retainer clip and adapted for being received into a complementary catch of a second retainer clip mounted on said mounting track adjacent said first retainer clip.

12. A cable retainer assembly according to claim 1, and comprising a catch formed with the base of said retainer clip proximate a circumference of the base and adapted for receiving a complementary resilient fitting of a second retainer clip mounted on said mounting track adjacent said first retainer clip.

13. A cable retainer clip adapted for being carried on a mounting track inside a fiber optic cable management cabinet for segregating, bundling, and routing fiber optic cable inside the cabinet, said retainer clip comprising:
   (a) a base;
   (b) an arcuate inner wall formed with and extending outwardly from said base, said inner wall defining a bend-radius control surface adapted for controlling the degree of bend experienced by fiber optic cable carried by said retainer clip; and (c) at least one outwardly-extending cable retainer arm formed with said base and spaced-apart from said bend-radius control surface to retain a bundled plurality of fiber optic cable therebetween inside the cabinet.

14. A retainer clip according to claim 13, and comprising clip adjustment means for adjusting the location of said retainer clip on the track.

15. A retainer clip according to claim 13, and comprising first and second resilient, spaced-apart pinch grips having respective mounting feet adapted for frictionally engaging the mounting track to hold said retainer clip in a fixed position on the track, said pinch grips adapted for being gripped by a user and pinched together to disengage the mounting feet from the mounting rails such that the position of said retainer clip on the track is slidably adjustable along a length of the track.

16. A retainer clip according to claim 15, wherein said resilient pinch grips extend radially outwardly from a surface of said inner wall opposite the bend-radius control surface.

17. A retainer clip according claim 13, wherein said cable retainer arm is generally L-shaped, and includes a first arm portion spaced-apart from the bend-radius control surface and extending generally perpendicular to a surface of the base, and a second arm portion integrally formed with the first arm portion and extending inwardly towards the bend-radius control surface generally parallel to the surface of the base.

18. A retainer clip according to claim 13, wherein a free end of said cable retainer arm is turned upwardly to facilitate placement of fiber optic cable between said cable retainer arm and the bend-radius control surface.

19. A retainer clip according to claim 13, and comprising an alignment key formed with said inner wall and adapted for being received into a complementary alignment slot of a second retainer clip mounted on the mounting track adjacent said first retainer clip.

20. A retainer clip according to claim 13, and comprising an alignment slot formed with said inner wall and adapted for receiving a complementary alignment key of a second retainer clip mounted on the mounting track adjacent said first retainer clip.

21. A retainer clip according to claim 13, and comprising a resilient fitting extending outwardly along a circumference of said base and adapted for being received into a complementary catch of a second retainer clip mounted on the mounting track adjacent said first retainer clip.

22. A retainer clip according to claim 13, and comprising a catch formed with said base proximate a circumference of said base and adapted for receiving a complementary resilient fitting of a second retainer clip mounted on the mounting track adjacent said first retainer clip.

23. A method of segregating, bundling, and routing fiber optic cable inside a fiber optic cable management cabinet, said method comprising the steps of:

(a) locating a mounting track inside the cabinet, the mounting track having first and second opposing end edges, and first and second opposing side edges; and (b) attaching an arcuate retainer clip to said track between the opposing end edges and side edges thereof, the retainer clip defining a bend-radius control surface adapted for controlling the degree of bend experienced by fiber optic cable carried by said retainer clip; and (c) adjusting the position of the retainer clip on the mounting track by sliding the retainer clip along the length of the mounting track to a desired location.

\* \* \* \* \*